United States Patent
Hayashibara

(10) Patent No.: US 7,801,002 B2
(45) Date of Patent: Sep. 21, 2010

(54) OPTICAL DISK REPRODUCING DEVICE

(75) Inventor: Kazuki Hayashibara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1153 days.

(21) Appl. No.: 11/441,013

(22) Filed: May 26, 2006

(65) Prior Publication Data
US 2006/0280086 A1 Dec. 14, 2006

(30) Foreign Application Priority Data
May 31, 2005 (JP) ............................ P2005-158606

(51) Int. Cl.
G11B 5/58 (2006.01)
(52) U.S. Cl. .................................. 369/53.21
(58) Field of Classification Search ............. 369/30.03, 369/53.21, 53.2; 386/69, 46, 126, 95, 125
See application file for complete search history.

(56) References Cited

U.S. PATENT DOCUMENTS 6,006,004 A * 12/1999 Moriyama et al. ............ 386/46

FOREIGN PATENT DOCUMENTS

| JP | A-2002-269754 | 9/2002 |
| JP | A-2002-313029 | 10/2002 |
| JP | 2003-141853 A | 5/2003 |
| JP | 2004-207904 | 7/2004 |
| JP | A-2004-348966 | 9/2004 |

* cited by examiner

*Primary Examiner*—Ali Neyzari
(74) *Attorney, Agent, or Firm*—Morgan, Lewis & Bockius LLP

(57) ABSTRACT

An reproducing device for reproducing information recorded on an information recording medium includes: a system controller that decides whether a user operation is inhibited or permitted when there is the user operation during reproducing the information of the information recording medium, and controls a reproduction to be temporarily stopped when the user operation is inhibited, and then, a process by the user operation to be performed and designated information to be reproduced; and a controller that is operated in accordance with an instruction of the system controller.

3 Claims, 5 Drawing Sheets

CONTENTS OF USER OPERATION CONTROL OF VOBU VOBU_UOP_CTL

| b31 | b30 | b29 | b28 | b27 | b26 | b25 | b24 |
|---|---|---|---|---|---|---|---|
| | | | RESERVATION | | | | UOP24 |

| b23 | b22 | b21 | b20 | b19 | b18 | b17 | b16 |
|---|---|---|---|---|---|---|---|
| UOP23 | UOP22 | UOP21 | UOP20 | UOP19 | UOP18 | RESERVATION | UOP16 |

| b15 | b14 | b13 | b12 | b11 | b10 | b9 | b8 |
|---|---|---|---|---|---|---|---|
| UOP15 | UOP14 | UOP13 | UOP12 | UOP11 | UOP10 | UOP9 | UOP8 |

| b7 | b6 | b5 | b4 | b3 | b2 | b1 | b0 |
|---|---|---|---|---|---|---|---|
| UOP7 | UOP6 | UOP5 | UOP4 | UOP3 | | RESERVATION | |

IN THE CONTENTS OF UOP0 TO UOP16, AND UOP18 TO UOP24, WHEN BIT IS 0, PERMIT CORRESPONDING USER OPERATION, AND WHEN BIT IS 1, INHIBIT CORRESPONDING USER OPERATION

32

| SYMBOL | CONTENTS |
|---|---|
| NV_PCK_LBN | LOGIC BLOCK OF NAVIGATION PACK |
| VOBU_CAT | CATEGORY OF VOBU |
| VOBU_UOP_CTL | USER OPERATION CONTROL OF VOBU |
| VOBU_S_PTM | REPRODUCTION START TIME OF VOBU |
| VOBU_E_PTM | REPRODUCTION FINISH TIME OF VOBU |
| VOBU_SE_E_PTM | REPRODUCTION FINISH TIME BY SEQUENCE END CODE IN VOBU |
| C_ELTM | CELL ELAPSE TIME |
| RESERVED | RESERVATION |

31 PLAY CONTROL INFORMATION DATA

| SYMBOL | CONTENTS |
|---|---|
| PGC_GI | ORDINARY INFORMATION OF PCI |
| NSML_AGLI | ANGLE INFORMATION FOR SEAMLESS |
| HLI | HIGHLIGHT INFORMATION |
| RECI | RECORDING INFORMATION |

FIG. 5

USER OPERATION CONTROLLED BY User_Operation_Control

| UOP BIT | USER FUNCTION | User_Operation_Control | | |
| --- | --- | --- | --- | --- |
| | | TT_SRPT | PGCI | VOBU |
| UOP0 | Time_Play (), Time_Search () | Yes(*1)(*2) | Yes | No |
| UOP1 | PTT_Play (), PTT_Search () | Yes(*1) | Yes | No |
| UOP2 | Title_Play () | | Yes | No |
| UOP3 | Stop () | | Yes | Yes |
| UOP4 | GoUp () in TT_DOM | | No | Yes |
| | GoUp () in Menu-space | | | |
| | GoUp () in case of Go UP PGCN has (FFFFh) value | | | |
| UOP5 | Time_Search () | | Yes | Yes |
| | PTT_Search () | | | |
| UOP6 | PrevPG_Search () | | Yes | Yes |
| | TopPG_Search () | | | |
| UOP7 | NextPG_Search () | | Yes | Yes |
| UOP8 | Forward_Scan () | | Yes | Yes |
| UOP9 | Backward_Scan () | | Yes | Yes |
| UOP10 | Menu_Call (Title) | | Yes | Yes |
| UOP11 | Menu_Call (Root) | | Yes | Yes |
| UOP12 | Menu_Call (Sub-picture) | | Yes | Yes |
| UOP13 | Menu_Call (Audio) | | Yes | Yes |
| UOP14 | Menu_Call (Angle) | | Yes | Yes |
| UOP15 | Menu_Call (PTT) | | Yes | Yes |
| UOP16 | Resume () | | Yes | Yes |
| UOP17 | Upper_Button_Select () | | Yes | No |
| | Lower_Button_Select () | | | |
| | Left_Button_Select () | | | |
| | Right_Button_Select () | | | |
| | Button_Activate () | | | |
| | Button_Select_and_Activate () | | | |
| UOP18 | Still_Off () | | Yes | Yes |
| UOP19 | Pause_On () | | Yes | Yes |
| - | Pause_Off () | | | |
| - | Menu_Language_Select () | | | |
| UOP20 | Audio_Stream_Change () | | Yes | Yes |
| UOP21 | Sub_picture_Stream_Change () | | Yes | Yes |
| UOP22 | Angle_Change () | | Yes | Yes |
| - | Parental_Level_Select () | | | |
| - | Parental_Country_Select () | | | |
| UOP23 | Karaoke_Audio_Presentation_Mode_Change () | | Yes | Yes |
| UOP24 | Video_Presentation_Mode_Change () | | Yes | Yes |

BLANK COLUMN: NOT APPLICABLE

OPTICAL DISK REPRODUCING DEVICE

BACKGROUND OF THE INVENTION

1. Field of the Invention

The present invention relates to an optical disk reproducing device for reproducing information recorded on an optical disk, and more particularly to a process of a user operation during reproducing an optical disk to which user operation control information for controlling whether or not the user operation is permitted or inhibited is additionally recorded.

2. Description of the Related Art

In an optical disk of a DVD (digital versatile disk) video propagated in recent years, a user operation can be restricted by writing information for inhibiting the user operation (UOP) about functions such as a head search, a quick feed, a quick return, etc. by a disk maker side.

FIG. 5 shows user functions capable of controlling the user operation by writing inhibiting information on the optical disk of the DVD video. In FIG. 5, Yes indicates that the user operation of a corresponding user function can be controller by a user operation bit (UOB) in a corresponding title search pointer table (TT-SRPT), program chain information (PGCI) or a video object unit (VOBU) and No indicates that the user operation cannot be controlled.

In such an optical disk reproducing device for reproducing the optical disk, after the optical disk is reproduced and the user operation control information showing whether the user operations as shown in FIG. 5 are permitted or inhibited, that is, the user operation control (VOBU-UOP-CTL) information of the video object unit (VOBU) included in a navigation pack (NV-PCK) of control information on the optical disk is read, when a user performs the user operation that is inhibited, a warning showing that the user operation is inhibited is displayed by a mark and the user function corresponding to the user operation is not executed in the optical disk.

SUMMARY OF THE INVENTION

As described above, in the usual optical disk reproducing device, whether a key input by the user operation (UOP) is inhibited or permitted is decided in accordance with the user operation control information previously recorded on the optical disk. Accordingly, when a reproduced part inhibits, for instance, a Title-Play ( ) showing a search process for designating a title, even if a user tries to search the title during a reproduction by operating a search key, the search is not performed. At this time, an inhibition mark or the like is displayed so that the process is invalidated.

In addition thereto, even when the user tries to perform a Menu-call ( ) showing a process for shifting to a menu, a PTT-Play ( ) showing a search process for designating both a title and a chapter, a PTT-Search ( ) showing a search process for designating a chapter, a Time-Play ( ) showing a search process for designating both a title and time and a Time-search ( ) showing a search process for designating time during the reproduction of the optical disk by operating keys, the process is not executed.

As determined by a DVD standard, the user operation is controlled not to be received and the above-described processes are controlled not to be executed during the reproduction of the optical disk. Accordingly, when a producer of a disk (a producer of recording information) desires to present an advertisement to a user side, the part of the advertisement is controlled not to be skipped during the reproduction of the optical disk and the above-described processes are controlled not to be executed. However, sometimes, the user may not desire to see the advertisement many times.

However, in the usual optical disk reproducing device, since the processes such as the Title-Play ( ), the Menu-Call ( ), the PTT-Play ( ), the PTT-Search ( ), the Time-Play ( ) and the Time-Search ( ) are not performed during the reproduction of the optical disk, a problem arises that a maneuverability is sometimes bad for the user.

In JP-A-2002-269754, permission/inhibition control information for controlling whether the user operation is permitted or inhibited is read from a recording medium before a reproduction is started so that the inhibited user operation can be recognized before the reproduction is started. However, in JP-A-2002-269754, the processes cannot be performed such as the Title-Play ( ), the Menu-Call ( ), the PTT-Play ( ), the PTT-Search ( ), the Time-Play ( ) and the Time-Search ( ) that inhibit the user operation during the reproduction of the optical disk.

In JP-A-2002-313029, when an operation designated by the user cannot be performed, if the operation is inhibited by a title producer or a specification of the device, a message to the effect that the operation is inhibited by the title producer or the specification of the device is displayed on a display device. However, also in this related art, the processes cannot be performed such as the Title-Play ( ), the Menu-Call ( ), the PTT-Play ( ), the PTT-Search ( ), the Time-Play ( ) and the Time-Search ( ) that inhibit the user operation during the reproduction of the optical disk.

In JP-A-2004-348966, a group user operation bits for determining whether the user operation is permitted or inhibited is taken out from the user operation control information included in reproduced control information, and when the group of user operation bits includes contents that inhibit the user operation, an operating key that is not inhibited by the contents of the group of the user operation bits is noticed or selectively displayed. However, also in this related art, the processes cannot be performed such as the Title-Play ( ), the Menu-Call ( ), the PTT Play ( ), the PTT Search ( ), the Time-Play ( ) and the Time-Search ( ) that inhibit the user operation during the reproduction of the optical disk.

The present invention is proposed to solve the above-described problems and it is an object of the present invention to provide an optical disk reproducing device having a function capable of performing processes even by a user operation that is inhibited by a DVD standard during a reproducing operation without violating the DVD standard.

In order to achieve the above-described object, according to a first aspect of the invention, there is provided an optical disk reproducing device for reproducing information recorded on an optical disk including: a system controller including: a user operation recognizing unit for recognizing a user operation when there is the user operation while the information of the optical disk is reproduced; an operation inhibition/permission deciding unit for deciding whether the recognized user operation is inhibited or permitted by user operation control information included in a navigation pack of control information on the optical disk; a reproduction temporarily stopping unit for temporarily stopping a reproduction when the operation inhibition/permission deciding unit decides that the user operation is inhibited; and a reproducing unit after stop for performing a process by the user operation and reproducing designated information after the reproduction is temporarily stopped by the reproduction temporarily stopping unit; and a controller that is operated in accordance with an instruction of the system controller.

In this structure, when there is the user operation while the information of the optical disk is reproduced, the user operation is recognized by the user operation recognizing unit and whether or not the recognized user operation is inhibited or permitted by the user operation control information included in the navigation pack of the control information on the optical disk is decided by the operation inhibition/permission deciding unit. When it is decided that the user operation is inhibited, the reproducing operation is temporarily stopped by the reproduction temporarily stopping unit. After the reproducing operation is temporarily stopped, the process by the user operation is performed and the designated information is reproduced by the reproducing unit after stop.

According to this structure, the processes can be performed such as the Title-Play ( ), the Menu-Call ( ), the PTT-Play ( ), the PTT-Search ( ), the Time-Play ( ) and the Time-Search ( ) that inhibit the user operation during the reproduction of the information of the optical disk, even by the user operation during the reproducing operation without violating the DVD standard.

According to a second aspect of the invention, there is provided a reproducing device for reproducing information recorded on an information recording medium including: a system controller that decides whether a user operation is inhibited or permitted when there is the user operation during reproducing the information of the information recording medium, and controls a reproduction to be temporarily stopped when the user operation is inhibited, and then, a process by the user operation to be performed and designated information to be reproduced; and a controller that is operated in accordance with an instruction of the system controller.

According to this structure, when there is the user operation during reproducing the information of the optical disk, it is decided whether the user operation is permitted or inhibited. When the user operation is inhibited, the reproduction is temporarily stopped and then, the process by the user operation is performed and the designated information is reproduced.

According to this structure, the processes can be performed such as the Title-Play ( ), the Menu-Call ( ), the PTT-Play ( ), the PTT-Search ( ), the Time-Play ( ) and the Time-Search ( ) that inhibit the user operation during the reproduction of the information of the optical disk, even by the user operation during the reproducing operation without violating the DVD standard.

According to a third aspect of the invention, the reproducing device according to the second aspect of the invention, wherein whether the user operation is inhibited or permitted is decided in accordance with user operation control information included in a navigation pack of control information on the information recording medium.

According to a fourth aspect of the invention, the reproducing device according to the second aspect of the invention, wherein the system controller includes: a user operation recognizing unit for recognizing a user operation when there is the user operation while the information of the information recording medium is reproduced; an operation inhibition/permission deciding unit for deciding whether the recognized user operation is inhibited or permitted in accordance with user operation control information included in a navigation pack of control information on the information recording medium; a reproduction temporarily stopping unit for temporarily stopping a reproduction when the operation inhibition/permission deciding unit decides that the user operation is inhibited; and a reproducing unit after stop for performing a process by the user operation and reproducing designated information after the reproduction is temporarily stopped by the reproduction temporarily stopping unit.

Accordingly, the system controller can carry out a user operation recognizing process, an operation inhibition/permission deciding process, a reproduction temporarily stopping process and a reproducing process after stop. Thus, the processes that inhibit the user operation during the reproducing operation can be performed without violating the DVD standard.

As described above, according to the present invention, the system controller is provided that includes a user operation recognizing unit for recognizing a user operation when there is the user operation while the information of the optical disk is reproduced; an operation inhibition/permission deciding unit for deciding whether the recognized user operation is inhibited or permitted by user operation control information included in a navigation pack of control information on the optical disk; a reproduction temporarily stopping unit for temporarily stopping a reproduction when the operation inhibition/permission deciding unit decides that the user operation is inhibited; and a reproducing unit after stop for performing a process by the user operation and reproducing designated information after the reproduction is temporarily stopped by the reproduction temporarily stopping unit. Accordingly, the processes can be performed such as the Title-Play ( ), the Menu-Call ( ), the PTT-Play ( ), the PTT-Search ( ), the Time-Play ( ) and the Time-Search ( ) that inhibit the user operation during the reproduction of the information of the optical disk, even by the user operation during the reproducing operation without violating the DVD standard.

Further, according to the present invention, a system controller is provided that decides whether a user operation is inhibited or permitted when there is the user operation during reproducing the information of the optical disk, and controls a reproduction to be temporarily stopped when the user operation is inhibited, and then, a process by the user operation to be performed and designated information to be reproduced. Accordingly, the processes can be performed such as the Title-Play ( ), the Menu-Call ( ), the PTT-Play ( ), the PTT-Search ( ), the Time-Play ( ) and the Time-Search ( ) that inhibit the user operation during the reproduction of the information of the optical disk, even by the user operation during the reproducing operation without violating the DVD standard.

BRIEF DESCRIPTION OF THE DRAWINGS

These and other objects and advantages of this invention will become more fully apparent from the following detailed description taken with the accompanying drawings in which:

FIG. 3 is a diagram for explaining contents of play control information data (PCI data) in FIG. 2;

FIG. 5 is a diagram showing user functions capable of controlling the user operation by writing inhibiting information on the optical disk of the DVD video.

DETAILED DESCRIPTION OF THE EMBODIMENTS

Figure 1:
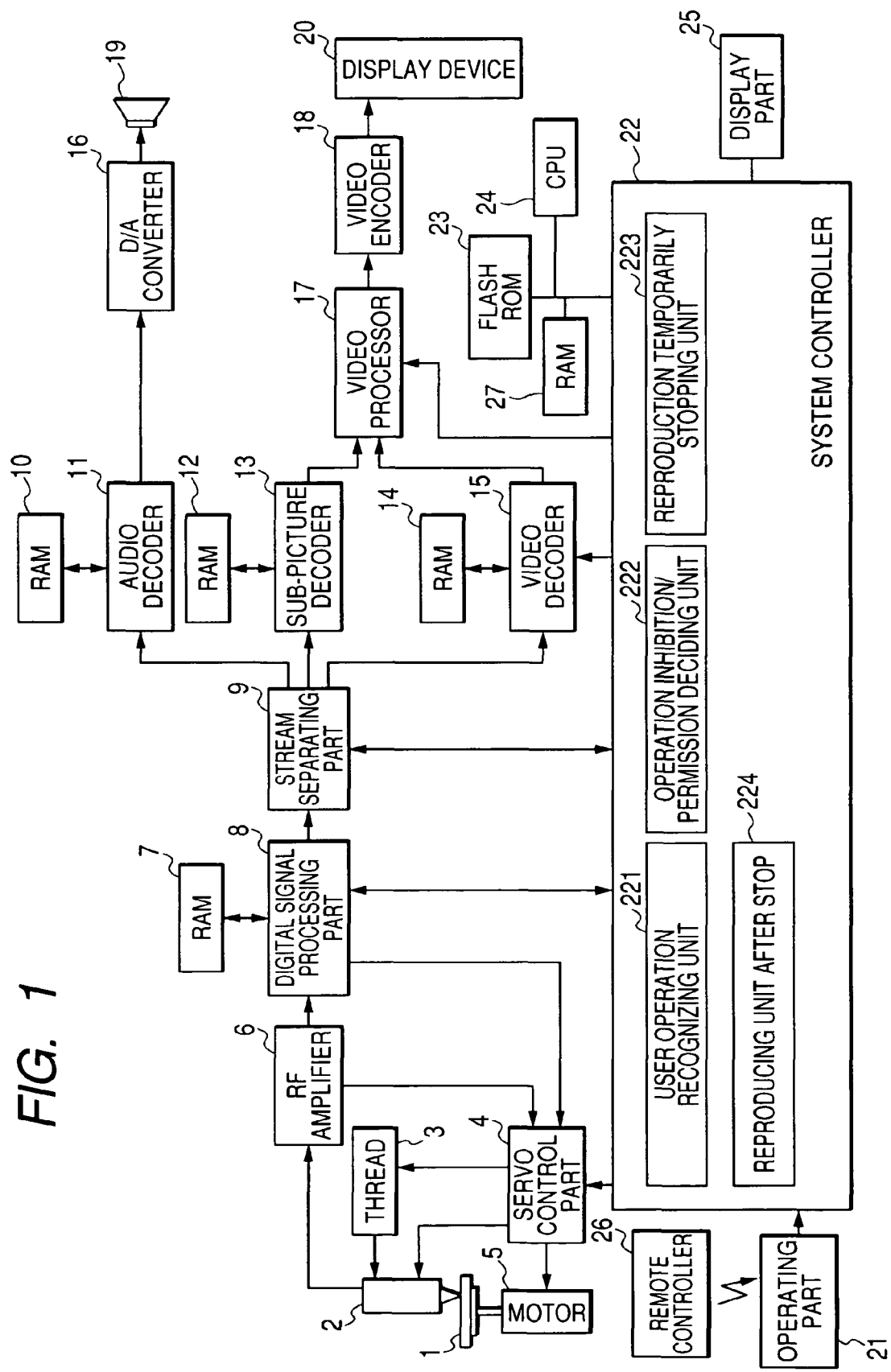
FIG. 1 is a block diagram showing the structure of an optical reproducing device according to one embodiment of the present invention.

Now, referring to the accompanying drawings, an embodiment of the present invention will be described below. FIG. 1 is a block diagram showing the structure of an optical disk reproducing device according to one embodiment of the present invention.

The optical disk reproducing device includes a spindle motor 5 for rotating an optical disk (a DVD or the like) 1, an optical pick-up 2 for outputting a laser beam for reproducing information on the optical disk 1 and receiving reflected light from the optical disk 1, a thread 3 for moving the optical pick-up 2 in the radial direction of the optical disk 1, a system controller 22 for controlling an entire part of the device and a servo control part 4 for controlling the spindle motor 5 and the thread 3 to be driven in accordance with an instruction of the system controller 22 and an objective lens (not shown in the drawing) incorporated in the optical pick-up 2 to be moved so as to move the focal position of the laser beam in the vertical direction and horizontal direction relative to a recording surface of the optical disk 1.

Further, the optical disk reproducing device includes an RF amplifier 6 for amplifying an RF signal as a reading signal from the optical pick-up 2 during reproducing the optical disk 1, a digital signal processing part 8 for converting the RF signal outputted from the RF amplifier 6 to digital data, and then, storing data formed by performing a signal demodulating process and an error correcting process corresponding to a data format of the optical disk 1 in a RAM 7 and a stream separating part 9 for separating audio data, sub-picture data and video data from a data stream outputted from the digital signal processing part 8 in accordance with the instruction of the system controller 22.

Further, the optical disk reproducing device includes an audio decoder 11 for inputting the audio data outputted from the stream separating part 9 to perform a prescribed decoding process, a RAM 10 for temporarily storing the data to perform the decoding process in the audio decoder 11, a sub-picture decoder 13 for inputting the sub-picture data outputted from the stream separating part 9 to perform a prescribed decoding process, a RAM 12 for temporarily storing the data to perform the decoding process in the sub-picture decoder 13, a video decoder 15 for inputting the video data outputted from the stream separating part 9 to perform a prescribed decoding process and a RAM 14 for temporarily storing the data to perform the decoding process in the video decoder 15.

Further, the optical disk reproducing device includes a video processor 17 for synthesizing the data outputted from the video decoder 15 with the data outputted from the sub-picture decoder 13 in accordance with the instruction of the system controller 22, a video encoder 18 for converting the synthesized data outputted from the video processor 17 to a video signal for displaying the synthesized data and displaying an image on a display device 20 and a D/A converter 16 for converting the data outputted from the audio decoder 11 to an analog audio signal and supplying the signal to, for instance, a speaker 19.

Further, the optical disk reproducing device includes a remote controller 26 having a reproducing key (not shown in the drawing) for supplying a reproducing instruction to the system controller 22, a stop key (not shown) for instructing a reproduction and stop, a quick feed key (not shown), a quick return key (not shown) and other various kinds of operating keys (not shown), and an operating part 21 having the number of operating keys smaller than that of the remote controller 26 and converting an optical signal to an electric signal by a light receiving unit (not shown in the drawing) for receiving the optical signal showing an operating instruction from the remote controller 26 to input a command signal to the system controller 22.

Further, the optical disk reproducing device includes a flash ROM 23 for storing a program or data for controlling components of the device or the entire part of the device, a CPU 24 for performing a computing process in accordance with the program or the data of the flash ROM 23 to control the system controller 22, a RAM 27 for temporarily storing data necessary for the computing process of the CPU 24 and a display part 25 of a main body side for displaying the contents of operations from the operating part 21 or the remote controller 26.

The system controller 22 includes, as components characteristic of this embodiment, a user operation recognizing unit 221 for recognizing a user operation when there is the user operation while the information of the optical disk 1 is reproduced; an operation inhibition/permission deciding unit 222 for deciding whether the recognized user operation is inhibited or permitted in accordance with user operation control information included in a navigation pack of control information on the optical disk 1; a reproduction temporarily stopping unit 223 for temporarily stopping a reproduction when the operation inhibition/permission deciding unit 222 decides that the user operation is inhibited; and a reproducing unit after stop 224 for performing a process by the user operation and reproducing designated information after the reproduction is temporarily stopped by the reproduction temporarily stopping unit.

Figure 2:
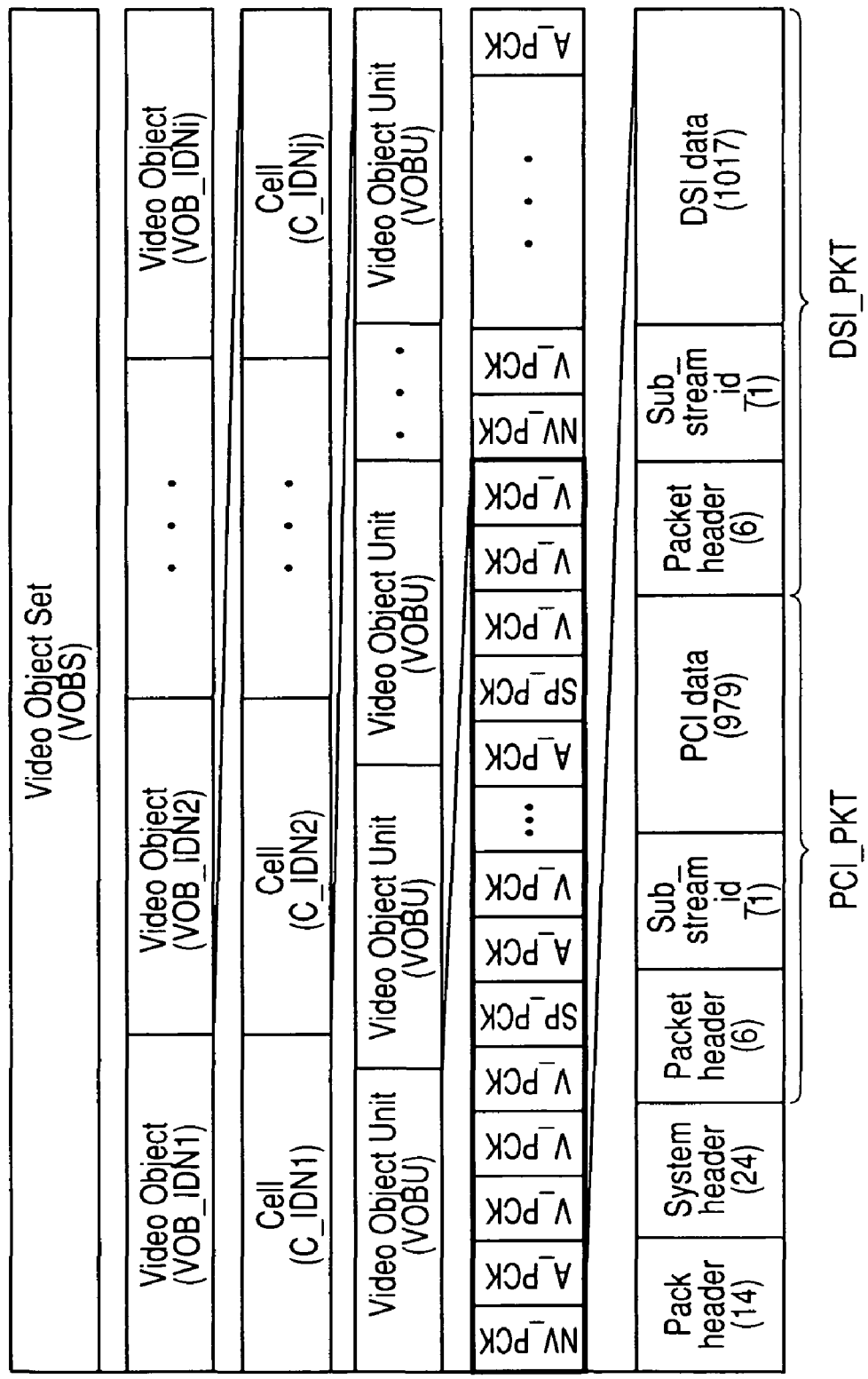
FIG. 2 is a diagram showing a data structure recorded on an optical disk of a DVD video in this embodiment.

FIG. 2 is a diagram showing a data structure recorded on the optical disk of a DVD video in this embodiment. In FIG. 2, a video object set (VOBS) is composed of a plurality of video objects (VOB), that is, a (VOB-IDN1), (VOB-IDN2), . . . , (VOB-IDNi), The IDN1, IDN2, . . . , IDNi designate identifying numbers. Each video object (VOB) is composed of a plurality of cells. For instance, the video object (VOB-IDN1) is composed of a plurality of cells (C-IDN1), (C-IDN2), . . . , (C-IDNj). The IDN1, IDN2, . . . , IDNj designate identifying numbers.

For instance, the cell (C-IDN1) is composed of a plurality of video object units (VOBU). Each video object unit (VOBU) includes a navigation pack (NV-PCK), an audio pack (A-PCK), a video pack (V-PCK) and a sub-picture pack (SP-PCK).

The navigation pack (NV-PCK) and the audio pack (A-PCK) are composed of, for instance, 2048 bytes, and include, a Pack header of 14 bytes, a System header of 24 bytes, a Packet header of 6 bytes, a sub-stream identifier (Sub-stream-id) of one byte, play control information data (PCI data) of 979 bytes, a Packet header of 6 bytes, a sub-stream identifier (Sub-stream-id) of one byte and data search information data (DSI data) of 1017 bytes.

The Packet header of 6 bytes, the sub-stream identifier (Sub-stream-id) of one byte and the play control information data (PCI data) of 979 bytes form a play control packet (PCI-PKT) The Packet header of 6 bytes, the sub-stream identifier (Sub-stream-id) of one byte and the data search information data (DSI data) of 1017 bytes form a data search information packet (DSI-PKT).

FIG. 3 is a diagram for explaining the contents of the play control information data (PCI data) in FIG. 2. In FIG. 3, reference numeral 31 designates the contents of the play control information data. 32 designates the contents of ordinary information of the PCI. 33 designates the contents of the user operation control of the VOBU (VOBU-UOP-CTL).

The play control information data (PCI data) includes the ordinary information of the PCI, angle information for non-seamless, highlight information and recording information. The ordinary information of the PCI includes the information of the logic block of the navigation pack, the category of the video object unit (VOBU), the user operation control of the video object unit (VOBU), a reproduction start time of the video object unit (VOBU), a reproduction finish time of the video object unit (VOBU), a reproduction finish time by a sequence end code in the video object unit (VOBU), a cell elapse time and a reservation.

The user operation control (VOBU-UOP-CTL) information of the video object unit (VOBU) can be obtained in such a way that each video title set (VTS) is searched by a title search pointer table (TT-SRPT) and the last video object unit (VOBU) of the video title set is searched on the basis of first video title set information (VTSI) thereof to obtain the user operation control (VOBU-UOP-CTL) information of the video object unit (VOBU) from the play control information (PCI) in the navigation pack (NV-PCK).

According to the user operation control (VOBU-UOP-CTL) information of the video object unit (VOBU), the user operation of a corresponding user function is controlled by user operation bits b3 to b16 and b18 to b24. When each user operation bit is 0, this means that the user operation of the corresponding user function is permitted. When each user operation bit is 1, this means that the user operation is inhibited.

Figure 4:
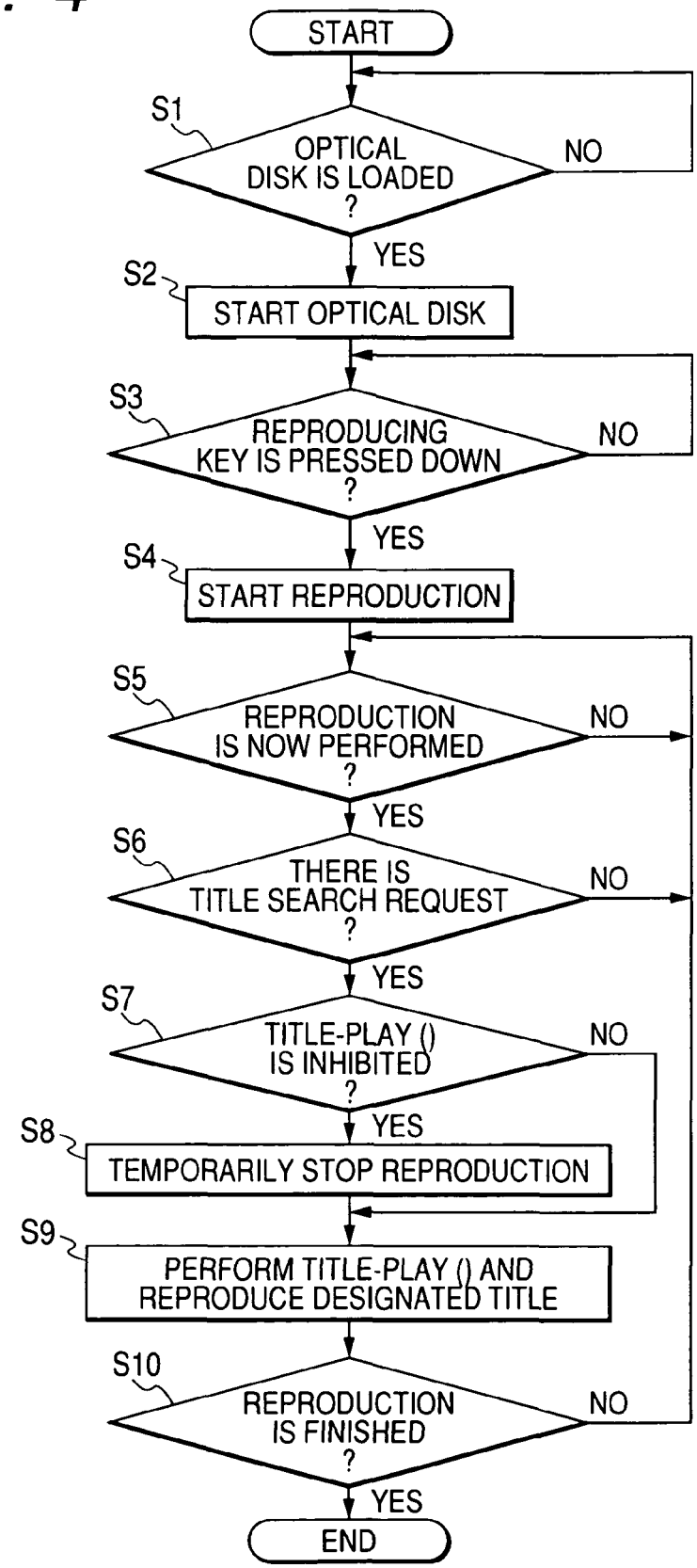
FIG. 4 is a flowchart for explaining processes for a user operation in this embodiment.

FIG. 4 is a flowchart for explaining processes relative to the user operation in this embodiment. By referring to the flowchart and FIGS. 1 to 3, the processes relative to the user operation will be described below.

The optical disk 1 in this case is a DVD. When the optical disk reproducing device is loaded with the optical disk 1, the system controller 22 of the optical disk reproducing device detects the loading of the optical disk 1 (step S1) to start the optical disk 1 (step S2). When the optical disk 1 is started, for instance, the reproducing key of the remote controller 26 is pressed down. When the system controller 22 detects the depression of the reproducing key (step S3), the system controller 22 rotates the spindle motor 5 through the servo control part 4 to rotate the optical disk 1 and drive the optical pick-up 2 through the servo control part 4 and start the reproduction of the information of the optical disk 1 (step S4).

When the reproducing operation is carried out by the above-described processes, the system controller 22 decides that the optical disk 1 is being now reproduced (step S5). Here, when, for instance, the title search key of the remote controller 26 is pressed down, the user operation recognizing unit 221 of the system controller 22 recognizes the depression of the title search key as the user operation for performing a search to designate a title. When the system controller decides that a title search request is present (step S6), the operation inhibition/permission deciding unit 222 of the system controller 22 checks the user operation control (VOBU-UOP-CTL) information of the video object unit (VOBU) included in the navigation pack (NV-PCK) to decide whether or not the Title Play ( ) is inhibited (step S7).

When it is decided that the Title-Play ( ) is inhibited, the reproduction temporarily stopping unit 223 of the system controller 22 temporarily stops the reproducing operation (step S8) and the reproducing unit after stop 224 of the system controller 22 performs the Title-Play ( ) as the user operation for performing the search to designate the title and reproduces the designated title (step S9). Then, the processes of the steps S5 to (S10) are repeated until the reproducing operation is completed. When the reproducing operation is completed (step S10), the procedure is finished.

In this embodiment, the processes when there is the Title Play ( ) during the reproducing operation are described, however, the present invention is not limited thereto, the processes can be performed such as the Menu-Call ( ), the PTT-Play ( ), the PTT-Search ( ), the Time-Play ( ) and the Time-Search ( ) even by the user operation during the reproducing operation without violating a DVD standard.

Namely, when the Menu-Call ( ) is inhibited, after the reproducing operation stopped, the process of the Menu-Call ( ) is performed. When the PTT-Play ( ) is inhibited, after the reproducing operation is stopped, the process of the PTT-Play ( ) is performed. When the PTT-Search ( ) is inhibited, after the reproducing operation is stopped, the process of the PTT-Play ( ) is performed. As for a TT (title) number, the TT number reproduced just before is designated. When the Time-Play ( ) is inhibited, after the reproducing operation is stopped, the process of the PTT-Play ( ) is performed. When the Time-Search ( ) is inhibited, after the reproducing operation is stopped, the process of the Time-Play ( ) is performed. As for a TT number, the TT number reproduced immediately before is designated.

As described above, according to this embodiment, since the system controller is provided that decides whether the user operation is inhibited or permitted when there is the user operation during reproducing the information of the optical disk, and controls the reproduction to be temporarily stopped when the user operation is inhibited, and then, the process by the user operation to be performed and the designated information to be reproduced, the processes can be performed such as the Title-Play ( ), the Menu-Call ( ), the PTT-Play ( ), the PTT-Search ( ), the Time-Play ( ) and the Time-Search ( ) that inhibit the user operation during the reproduction of the information of the optical disk, even by the user operation during the reproducing operation without violating the DVD standard. After the reproducing operation of the optical disk is temporarily stopped, the above-described processes are respectively carried out. However, during stopping the reproducing operation, a reproduced image may be kept displayed.

Besides, the invention is not limited to the above embodiments but various changes and modifications of its components may be without departing from the scope of the present invention. For example, various information recording mediums can be used as substitute for the optical disk.

What is claimed is:

1. A reproducing device for reproducing information recorded on an information recording medium comprising:

a system controller that decides whether a user operation is inhibited or permitted when there is the user operation during reproducing the information of the information recording medium, and controls a reproduction to be temporarily stopped when the user operation is inhibited, and then, a process by the user operation to be performed and designated information to be reproduced; and a controller that is operated in accordance with an instruction of the system controller, wherein the system controller includes:

a user operation recognizing unit for recognizing a user operation when there is the user operation while the information of the information recording medium is reproduced;

an operation inhibition/permission deciding unit for deciding whether the recognized user operation is inhibited or permitted in accordance with user operation control information included in a navigation pack of control information on the information recording medium;

a reproduction temporarily stopping unit for temporarily stopping a reproduction when the operation inhibition/permission deciding unit decides that the user operation is inhibited; and a reproducing unit after stop for performing a process by the user operation and reproducing designated information after the reproduction is temporarily stopped by the reproduction temporarily stopping unit.

2. The reproducing device according to claim 1, wherein whether the user operation is inhibited or permitted is decided in accordance with user operation control information included in a navigation pack of control information on the information recording medium.

3. The reproducing device according to claim 1, wherein the user operation control information includes at least one of a search process for designating a title, a process for shifting to a menu, a search process for designating both a title and a chapter, a search process for designating a chapter, a search process for designating both a title and time, and a search process for designating time.

* * * * *